United States Patent Office 2,844,595
Patented July 22, 1958

2,844,595
ORGANIC AZIDES OF THE PHTHALIDE TYPE

Samuel W. Waisbrot, Akron, Ohio, assignor to The Goodyear Tire & Rubber Company, Akron, Ohio, a corporation of Ohio No Drawing. Application May 24, 1954
Serial No. 432,015

9 Claims. (Cl. 260—343.3)

This invention relates to new compositions of matter and particularly to their use as blowing agents in the manufacture of cellular compositions.

Many chemical blowing agents are known, including the carbonates, the sulfites, the nitrites, the triazines, the sulfonyl hydrazides and the sulfonyl azides. Many factors determine the usefulness of these blowing agents. For example, it is important that they form non-toxic decomposition by-products. It is also important that the blowing agent decompose to form a gas at a controlled rate. Also, it is important that the blowing agent release its gas at a temperature at which the material becomes blowable. It is also desirable that the blowing agent function in a tightly closed mold. Again, it is important that the blowing agent be uniformly dispersible in the material being blown. Also, the by-products of decomposition of the blowing agent should not impart a color or an odor to the material being blown.

A new class of blowing agents has now been discovered which possesses the many properties needed in a successful and commercially useful blowing agent. This new class of blowing agents is the organic azides of the phthalide type. More specifically, these new blowing agents which are new compositions of matter have the structural formula

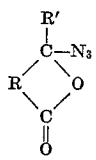

in which R is a radical selected from the group consisting of the ortho and peri residues of aromatic nuclei and vinylene.

Specific values of R include orthophenylene having the structural formula

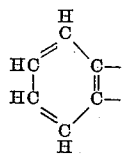

peri naphthylene having the structural formula

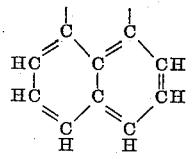

and substituted vinylene having the structural formula

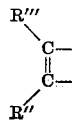

wherein R'' and R''' are bromine, chlorine and hydrogen. When R'' and R''' are hydrogen, the specific compound is malealdehydic acid (also known as hydroxylactan). When R'' and R''' are bromine, then the specific compound is known as mucobromic acid. When R'' and R''' are chlorine, then the specific compound is mucochloric acid.

R' is a radical selected from the group consisting of hydrogen, aryl, fused aryl, and a radical having the structural formula

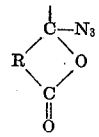

in which R has the value mentioned for R above.

These azido compounds are prepared by treating an ortho or peri aldehydic or an ortho or peri ketonic acid with a replacement agent such as thionyl chloride, phosphorus trichloride, phosphorus pentachloride, etc. to form the corresponding chlorinated lactone which is then treated with an alkali metal azide in the presence of water to form the desired azide of the lactone. The presence of too much water tends to cause hydrolysis of the labile halide forming a hydroxyl group which is inert to reaction with sodium azide. However, it has been found that water present in amount from 1 to 5% by weight based on the weight of the reactants causes a maximum conversion of the chloro lactone to the azido lactone in the presence of the metal azide.

Typical aldehydic acids that may be treated with a replacement reagent such as thionyl chloride to form the corresponding chlorinated lactone are ortho phthalaldehydic acid, having the formula

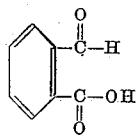

which forms the gamma chloro gamma lactone; naphthaldehydic acid, having the formula

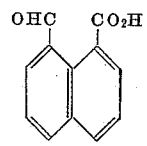

which forms the delta chloro delta lactone; malealdehydic acid having the formula

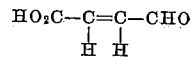

and mucobromic acid having the formula

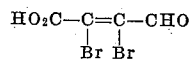

which both form the corresponding gamma chloro gamma lactone. An example of a ketonic acid that may be used in producing a lactone is benzoyl benzoic acid having the formula

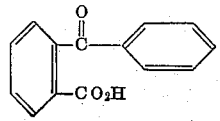

which forms the corresponding gamma chloro gamma lactone; and diphthalyl acid having the formula

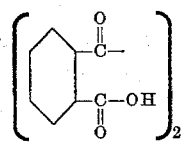

which forms the corresponding 3-3' biphthalidyl.

The chloro compound of each of these aldehydic and ketonic acids is readily prepared by treatment with a replacement reagent such as thionyl chloride.

The following examples will illustrate methods of preparing the new compositions of matter of this invention, in which all parts are by weight unless otherwise identified.

*Example 1*

Four hundred fifteen parts of 3-chlorophthalide was placed in a reaction vessel fitted with an agitator with 200 parts of sodium azide and 400 parts of acetone. Fifty parts of water was then added and the mixture vigorously agitated for 6 hours at room temperature (72° F.). The resulting reaction mixture was diluted with a large amount of water to cause the reaction product to be precipitated. The precipitate which was formed was filtered and washed with water and air dried. A 94% yield of 3-azidophthalide having a decomposition temperature of 110° C. and a melting point of 47–48° C. was recovered.

*Example 2*

Two and one third parts of 1,8-naphthaldehydic acid was treated with 9 parts of thionyl chloride to produce the corresponding chloronaphthalide. The reaction was allowed to proceed for 24 hours, during which time HCl and $SO_2$ were evolved. The resulting reaction mixture was diluted with petroleum ether and the resulting crystalline precipitate was filtered, washed with petroleum ether, and air dried. A yield of 92% of the new composition, chloronaphthalide, having a melting point in the range of 195–205° C. was obtained.

Two and one third parts of this new compound, 3-chloronaphthalide was reacted with 1 part of sodium azide in the presence of 1 part of water in acetone. The acetone mixture was shaken for 1 hour at room temperature (72° F.) and the resulting reaction product was then poured into ice water. The crystalline material which resulted from this dilution in water was filtered, washed with water, and air dried. A yield of 2 parts of 3-azidonaphthalide having a melting point in the range of 99–102° C. was obtained.

*Example 3*

Six parts of 3-chloro-3-mesityl phthalide was reacted with 5 parts of sodium azide in the presence of 1 part of water in acetone for 1 hour at room temperature (72° F.) during constant agitation. The reaction product was poured into ice water. Dilution with water caused the precipitation of 3-azido-3-mesityl phthalide having a melting point of 216° C.

*Example 4*

Eight parts of 3-chloro-3-(p-tolyl) phthalide was reacted with 5 parts of sodium azide in the presence of 1 part of water in acetone for 1 hour at room temperature during agitation of the mixture. The resulting reaction product was diluted in ice water and a quantity of 3-azido-3-(p-tolyl) phthalide was recovered as an oil.

*Example 5*

Twenty-five parts of 3-chloro-3-phenyl phthalide was reacted with 8 parts of sodium azide in the presence of 1 part of water in acetone for 1 hour at room temperature (72° F.) during agitation. The resulting reaction mixture was diluted in ice water to form a precipitate of 3-azido-3-phenyl phthalide having a decomposition temperature of 155° C. and a melting point of 76–77° C.

*Example 6*

Twenty-eight and one-half parts of diphthalide was reacted with 90 parts of thionyl chloride for 24 hours during which time HCl and $SO_2$ were evolved. The resulting reaction mixture was diluted with petroleum ether and 17 parts of 3,3'-dichloro diphthalide having a melting point of 250–253° C. was recovered.

Five parts of 3,3'-dichloro diphthalide was reacted with 5 parts of sodium azide in the presence of 1 part of water in acetone for 1 hour at room temperature during agitation. The resulting mixture was diluted in ice water to form a precipitate of 3,3'-diazido diphthalide which decomposes without melting at temperatures above 200° C.

Each of the azidolactones identified in the examples above may be used as blowing agents in the production of cellular rubber in accordance with the folowing general formula:

| | Parts |
|---|---|
| Rubbery copolymer of styrene and butadiene (GR–S type of rubber) | 100 |
| Reinforcing filler (clay, whiting, calcium silicate) | 5 to 100 |
| Fibrous material | 0 to 50 |
| Sulfur | 1 to 5 |
| Organic accelerator (tetramethyl thiuramdisulfide, mercaptobenzothiazole, etc.) | 1 to 3 |
| Zinc oxide | 3 to 6 |
| Antioxidant | 0.5 to 2 |
| Softener (mineral oil, etc.) | 5 to 20 |
| Coloring agent | As desired |
| Azidolactone (blowing agent) | 6 to 10 |

The rubbery copolymer is compounded on a rubber mill or mixed in a Banbury mixer at a temperature from 140° F. to 160° F., and preferably 150° F., with the above-identified ingredients, with the exception of the blowing agent, until a homogeneous blend of the components is produced. The blowing agent is then added to the mixture at a temperature of about 110° F. until thoroughly dispersed throughout the mixture. A weighed amount of the blowable mixture is then inserted in a closed mold, for example, a No. 8 shoe sole mold, which has been heated to about 300° F. and closed under a pressure of about 200 pounds per sq. in. Sufficient material is used to fill the mold. The mold is then heated to 320° F. for 11 minutes to complete the cure in the mold while maintaining the pressure constant. After completion of the cure of the mold, the stock is removed while hot and allowed to expand. A shoe sole is produced having a specific gravity of about 0.90 containing closed cells filled with nitrogen gas.

Each of the azidolactones identified above may also be used as blowing agents in the production of a cellular vinyl resin composition using the following ingredients:

| | Parts |
|---|---|
| Vinyl resin (polyvinyl chloride) | 100 |
| Plasticizer (tricresyl phosphate, dioctyl phthalate, etc.) | 0–200 |
| Stabilizer (magnesium oxide) | 3–10 |
| Azidolactone (blowing agent) | 20–50 |

The vinyl resin is compounded into a plastisol using about 125 parts of tricresyl phosphate together with the addition of about 5 parts of magnesium oxide at room temperature. The blowing agent is then stirred into the plastisol at room temperature. A mold is then filled with the resulting homogeneous mixture. The mold is then closed against pressure and heated at from 320 to 350° F. until the blowing agent has decomposed which requires from about 10 minutes to one hour depending upon the volume of the cellular article being made. The mold is then cooled under pressure and then opened to release the blown vinyl resin. The blown vinyl resin is then placed in an oven and heat-cured at from 200 to 300° F. for from 1 to 24 hours, depending upon the volume of the article, in order to stabilize the size of the article. A density of from about 4½ to 5 pounds per cubic feet is obtained when using about 35 parts of the blowing agent. The stiffness of the article depends on the amount of plasticizer used. If an especially stiff cellular article is desired, no plasticizer need be used but a solvent may be used to place the resin in solution, to which solution the blowing agent is then added.

The azidolactones of this invention may be used in the production of cellular products in amounts from .05% to 50%, and desirably from 1% to 20%. The azidolactones mentioned herein may be used in combination with each other as well as separately in producing cellular products. The density of the cellular product may be controlled through the amount of the lactone being used. The density of the cellular product may also be controlled by adjusting the viscosity of the material being blown at the temperature at which it becomes blowable.

The cellular products of this invention may be used for many different purposes. For example, the cellular vinyl chloride polymers may be used in the production of life rafts because the cellular material is impervious to moisture and resistant to deterioration by salt water and sun rays. Cellular rubber made from natural rubber is useful as under-carpet padding. Cellular material made from urea formaldehyde resins is useful as an insulation material against heat transfer.

While certain representative embodiments and details have been shown for the purpose of illustrating the invention, it will be apparent to those skilled in this art that various changes and modifications may be made therein without departing from the spirit or scope of the invention.

What is claimed is:

1. As a new composition of matter, an organic azidolactone having the general structural formula

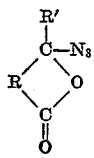

in which R is a radical selected from the group consisting of ortho and peri residues of aromatic hydrocarbon nuclei and a substituted vinylene having the general formula

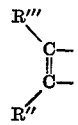

where R″ and R‴ are a constituent selected from the group consisting of bromine, chlorine and hydrogen and in which R′ is a radical selected from the group consisting of hydrogen, aryl, fused aryl and

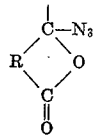

2. 3-azido-3-mesityl phthalide.
3. 3-azido-3-(p-tolyl) phthalide.
4. 3-azido-3-phenyl phthalide.
5. 3,3′-diazidodiphthalide.
6. 3-azido phthalide.
7. A method of preparing a monoazidolactone which comprises reacting a chlorolactone having the general formula

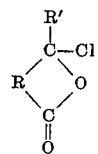

in which R is a radical selected from the group consisting of ortho and peri residues of aromatic hydrocarbon nuclei and a substituted vinylene having the general formula

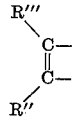

where R″ and R‴ are a constituent selected from the group consisting of bromine, chlorine and hydrogen and in which R′ is a radical selected from the group consisting of hydrogen, aryl, fused aryl and

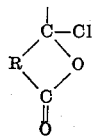

with an alkali metal azide in the presence of acetone and less than 5% of water based on the reactants.

8. The method of claim 7 in which the chlorolactone is a delta chloro delta lactone.

9. The method of claim 7 in which the chlorolactone is a gamma chloro gamma lactone.

References Cited in the file of this patent
UNITED STATES PATENTS
2,299,593    Roberts et al. _____ Oct. 20, 1942

OTHER REFERENCES
Tanaka et al.: Chem. Abst., vol. 46, p. 11743 (1952).
Lindemann et al.: Annalen, 464, pp. 243, 245, 249 (1928).